United States Patent
Juri et al.

(10) Patent No.: US 8,406,306 B2
(45) Date of Patent: Mar. 26, 2013

(54) IMAGE DECODING APPARATUS AND IMAGE DECODING METHOD

(75) Inventors: Tatsuro Juri, Osaka (JP); Takuma Chiba, Osaka (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 12/717,367

(22) Filed: Mar. 4, 2010

(65) Prior Publication Data

US 2010/0226439 A1 Sep. 9, 2010

(30) Foreign Application Priority Data

Mar. 6, 2009 (JP) ................... 2009-054265

(51) Int. Cl.
*H04B 1/66* (2006.01)
(52) U.S. Cl. .................................. 375/240.16
(58) Field of Classification Search ........... 375/240.16–240.19; H04B 1/66
See application file for complete search history.

(56) References Cited

U.S. PATENT DOCUMENTS

| | | | |
|---|---|---|---|
| 5,841,475 A | 11/1998 | Kurihara et al. | |
| 5,926,647 A * | 7/1999 | Adams et al. | 712/36 |
| 5,953,691 A * | 9/1999 | Mills | 702/198 |
| 6,088,355 A * | 7/2000 | Mills et al. | 370/392 |
| 6,256,045 B1 * | 7/2001 | Bae et al. | 348/445 |
| 6,311,204 B1 * | 10/2001 | Mills | 718/100 |
| 6,735,340 B1 | 5/2004 | Ohno | |
| 6,950,469 B2 * | 9/2005 | Karczewicz et al. | 375/240.17 |
| 7,003,035 B2 * | 2/2006 | Tourapis et al. | 375/240.12 |
| 7,280,599 B2 * | 10/2007 | Karczewicz et al. | 375/240.17 |
| 7,349,473 B2 * | 3/2008 | Hallapuro et al. | 375/240.12 |
| 7,965,773 B1 * | 6/2011 | Schlanger et al. | 375/240.16 |
| 8,036,273 B2 * | 10/2011 | Karczewicz et al. | 375/240.17 |
| 2002/0114396 A1 | 8/2002 | Todoroki | |
| 2007/0040708 A1 | 2/2007 | Senda | |
| 2007/0286280 A1 | 12/2007 | Saigo et al. | |
| 2008/0205527 A1 | 8/2008 | Watanabe et al. | |
| 2008/0259089 A1 | 10/2008 | Matsubara | |
| 2008/0279280 A1 | 11/2008 | Iguchi et al. | |

FOREIGN PATENT DOCUMENTS

| | | |
|---|---|---|
| JP | 8-130741 | 5/1996 |
| JP | 11-298903 | 10/1999 |
| JP | 2000-175199 | 6/2000 |
| JP | 2002-247583 | 8/2002 |
| JP | 2007-329827 | 12/2007 |
| JP | 2008-271292 | 11/2008 |
| JP | 2008-278423 | 11/2008 |
| WO | 2005/041420 | 5/2005 |
| WO | 2007/055013 | 5/2007 |

* cited by examiner

*Primary Examiner* — Tung Vo
(74) *Attorney, Agent, or Firm* — Wenderoth, Lind & Ponack, L.L.P.

(57) ABSTRACT

An image decoding apparatus that performs decoding using motion compensation includes: a reference area specifying unit that specifies, prior to decoding performed on a block-by-block basis, a reference area that is an existing range of reference pixels in a reference picture based on a block on which motion compensation is to be performed; a decoded pixel memory which stores decoded pixel data; a reference pixel buffer that holds reference pixel data; a reference-pixel-reading control unit that copies pixel data of an area including the reference area specified by said reference area specifying unit, from said decoded pixel memory into said reference pixel buffer; a motion compensation unit that generates interpolation pixel data by performing the motion compensation using reference pixel data copied into said reference pixel buffer; and a pixel value decoding unit that generates decoded pixel data using the interpolation pixel data.

4 Claims, 7 Drawing Sheets

IMAGE DECODING APPARATUS AND IMAGE DECODING METHOD

BACKGROUND OF THE INVENTION (1) Field of the Invention

The present invention relates to an image decoding apparatus and method of decoding coded image data using motion compensation.

(2) Description of the Related Art

With the advancement of digitalization for image data in recent years, recording and transmitting moving image data that includes a large amount of data is commonly carried out after reducing the amount of data using image coding.

Image coding systems with high efficiency such as MPEG2 and MPEG4 AVC/H.264 (hereinafter abbreviated as the H.264) are often employed for the above purpose.

With these coding systems, coding is carried out for each rectangular unit (formed typically of 16 horizontal pixels and 16 vertical pixels) which is called a macroblock.

When coding a macroblock, a pattern similar to a pattern of the macroblock is searched for, in other fields or frames in which coding has been carried out, and taken out, and a difference value from a pixel value of the macroblock is coded, so that the compression efficiency is increased.

The above processing is called motion compensation, and when performing image coding, vector information indicating the position of a pixel value that has been taken out is simultaneously coded as a motion vector.

The following describes, with reference to FIG. 7, a configuration example of an image decoding apparatus that decodes coded data by using motion compensation.

FIG. 7 is a block diagram which shows an example of the configuration of a conventional image decoding apparatus.

A conventional image decoding apparatus 400 as shown in FIG. 7 includes: an input unit 401; a variable length decoding unit 403; a pixel value decoding unit 404; a motion vector detecting unit 405; a motion compensation unit 406; an output unit 407; and a memory 408.

The variable length decoding unit 403 performs variable length decoding, on a macroblock-by-macroblock basis, on image coded data that has been inputted by the input unit 401. The motion vector detecting unit 405 extracts, from among data on which variable length decoding has been performed, the motion vector corresponding to the macroblock. The motion compensation unit 406 reads a pixel value necessary for the motion compensation from decoded pixel data stored in the memory 408 and generates a motion compensation pixel.

Further, the pixel value decoding unit 404 generates motion compensation difference data corresponding to the macroblock by using the data decoded by the variable length decoding unit 403. The pixel value decoding unit 404 further generates decoded pixel data by adding the motion compensation difference data and a motion compensation value obtained from the motion compensation unit 406.

The decoded pixel data is temporarily stored in the memory 408, and then outputted from the output unit 407 according to a reproduction timing of TV and the like. In addition, the decoded pixel data stored in the memory 408 is used also for motion compensation performed on another macroblocks.

Here, the configuration of the image decoding apparatus 400 shown in FIG. 7 allows imaged coded data to be decoded into moving image data. In addition, in the above-described motion compensation, a pixel at an arbitrary position in a picture that has been decoded can be referred to for each macroblock or each block in a divided macroblock.

Thus, it is necessary, in order to perform motion compensation, to read from the memory 408 a pixel value at a random position for each macroblock.

Since image data obtained thorough image decoding has, in general, a significantly large amount of data, the memory 408 described above is configured of an external dynamic random access memory (DRAM). Further, in the case where data is read randomly in a small rectangular unit such as a macroblock, a significant overhead occurs. Thus, it is difficult to read data from the DRAM at high speed.

Thus, a large number of costly high-speed DRAMs need to be used in parallel for decoding large volumes of a high-speed moving image such as a high-definition image. This leads to a great amount of circuitry cost and power consumption.

Patent Literature 1 (U.S. Pat. No. 6,735,340) discloses a technique related to an image decoding apparatus that improves such problems. To be specific, the Patent Literature 1 discloses a technique for reducing a memory access to an external DRAM in decoding data on which the H.264 coding has been performed.

Here, the H.264 employs a technique of intra frame prediction in addition to the motion compensation so as to reduce image information. The intra frame prediction is a technique with which, when coding a macroblock, an interpolation pixel is generated by using a pixel value of a coded macroblock adjoining the macroblock to be coded, to code a difference value between a pixel value of the macroblock to be coded and a pixel value of the interpolation pixel.

According to the image decoding apparatus described in the Patent Literature 1, when decoding image coded data by using the intra frame prediction, a pixel value of a decoded macroblock adjoining a macroblock to be decoded is stored in a cache memory.

This enables decoding by using the data stored in the cache memory without directly reading data from an external DRAM when generating an interpolation pixel for intra frame prediction for each macroblock.

SUMMARY OF THE INVENTION

In the technique described in the above Patent Literature 1, however, the cache memory is used for generating the interpolation pixel for the intra frame prediction. Thus, the technique cannot be used for reducing a DRAM access for generating the interpolation pixel for motion compensation.

To be specific, in the intra frame prediction, only the pixel of a macroblock adjoining a macroblock to be decoded is used. Thus, the amount of data to be stored in the cache memory is small, and a relative position of a pixel to be stored with respect to the macroblock to be decoded is fixed Whereas, in the case where an image involves a great amount of motion, there is a possibility that an area in which reference pixels necessary for performing motion compensation exist is significantly large and varies a lot for each macroblock. Thus, the pixel position to be read from the DRAM is cannot be predicted in advance.

Therefore, it is necessary for conventional image decoding apparatuses to read a reference pixel for motion compensation from the DRAM in decoding processing for each macroblock. This leads to a significantly large amount of DRAM access, more specifically, a significantly large number of reading from a random position.

This necessitates, as a result, implementing a large number of costly high-speed DRAMs for the conventional image decoding apparatuses as described above, which leads to a problem that circuitry costs and power consumption increase.

The present invention has been conceived to solve the problems described above, and aims to provide an image decoding apparatus and an image decoding method with reduced circuitry costs and power consumption by reducing the amount of external memory access.

In order to achieve the object described above, an image decoding apparatus according to an aspect of the present invention is an image decoding apparatus which decodes a coded stream using motion compensation, the image decoding apparatus including: a reference area specifying unit configured to specify, prior to decoding performed on a block-by-block basis in a base area, a reference area that includes reference pixels to be used for motion compensation of the base area, by using motion vector related information on each of blocks in the base area, the reference area being an existing range of the reference pixels in a reference picture based on a block on which motion compensation is to be performed, and the base area being part or all of a picture included in the coded stream; a decoded pixel memory which stores decoded pixel data that includes a pixel value of a pixel included in the reference picture; a reference pixel buffer that holds reference pixel data to be used for the motion compensation; a reading control unit configured to copy pixel data of an area including the reference area specified by the reference area specifying unit, from the decoded pixel memory into the reference pixel buffer, the pixel data being continuous and part of the reference picture; a motion compensation unit configured to generate interpolation pixel data by performing the motion compensation using reference pixel data included in the pixel data copied into the reference pixel buffer by the reading control unit; and a pixel value decoding unit configured to generate decoded pixel data using the interpolation pixel data generated by the motion compensation unit.

With the above-described structure, the reference pixel data to be used for motion compensation in decoding is included in continuous pixel data that is part of the reference picture and copied in advance from the decoded pixel memory to the reference pixel buffer. In addition, the reference pixel data copied in the reference pixel buffer is used in subsequent motion compensation.

This enables loading the reference pixel data to be used for motion compensation into the reference pixel buffer by sequentially reading adjoining data in a predetermined unit in the decoded pixel memory, for example.

Thus, data is efficiently read in the case where a decoded pixel memory is implemented using an external DRAM, for example. To be specific, overhead that conventionally occurs accompanying reading of reference pixel data from an external DRAM is reduced. Further, the amount of power consumption in reading reference pixel data is also reduced.

That means it is possible to perform decoding efficiently without including costly high-speed DRAMs even in the case of decoding a moving image of high-speed and large capacity such as a high-definition image.

Furthermore, since the pixel data that is part of the reference picture is copied into the reference pixel buffer, capacity of the reference pixel buffer can be minimized.

Further, in the image decoding apparatus according to another aspect of the present invention, the coded stream may be obtained by coding that involves arithmetic coding, and the image decoding apparatus may further include: an arithmetic decoding unit configured to generate arithmetic decoded data by performing arithmetic decoding on the coded stream; a decoded data memory which stores the arithmetic decoded data generated by the arithmetic decoding unit; and an arithmetic decoded data decoding unit configured to read the arithmetic decoded data from the decoded data memory, and to decode the read arithmetic decoded data, wherein the reference area specifying unit is configured to obtain the motion vector related information on each of the blocks from the arithmetic decoded data generated by the arithmetic decoding unit, the motion compensation unit is configured to generate the interpolation pixel data using the motion vector obtained by decoding performed by the arithmetic decoded data decoding unit and the reference pixel data stored in the reference pixel buffer, and the pixel value decoding unit is configured to generate the decoded pixel data using residual pixel data obtained by decoding performed by the arithmetic decoded data decoding unit and the interpolation pixel data generated by the motion compensation unit.

With the above-described structure, the image decoding apparatus according to the present aspect can be implemented as an apparatus that efficiently reads reference pixel data from a memory while efficiently decoding arithmetic coded data.

More specifically, arithmetic decoded data obtained by decoding an arithmetic code is temporarily stored into a decoded data memory. Then, the arithmetic decoded data is read in synchronization with image decoding on a macroblock basis and processed.

Here, the image decoding apparatus according to the present aspect specifies a reference area by obtaining, from the arithmetic decoded data, motion vector related information for each of the macroblocks simultaneously with storing into the decoded data memory.

Thus, processing such as specifying a reference area is efficiently carried out by using the delay period that inevitably occurs accompanying arithmetic decoding. Therefore, the entire decoding processing does not have to be delayed for the processing.

Further, in the image decoding apparatus according to another aspect of the present invention, the coded stream may be obtained by coding that involves system coding, and the image decoding apparatus may further include: a system decoding unit configured to generate system decoded data by performing system decoding on the coded stream; a decoded data memory which stores the system decoded data generated by the system decoding unit; and a variable length decoding unit configured to read the system decoded data from the decoded data memory, and to perform variable length decoding on the read system decoded data, wherein the reference area specifying unit is configured to obtain the motion vector related information on each of the blocks using the system decoded data generated by the system decoding unit, the motion compensation unit is configured to generate the interpolation pixel data using a motion vector obtained by decoding performed by the variable length decoding unit and the reference pixel data stored in the reference pixel buffer, and the pixel value decoding unit is configured to generate the decoded pixel data using residual pixel data obtained by decoding performed by the variable length decoding unit and the interpolation pixel data generated by the motion compensation unit.

With the above-described structure, the image decoding apparatus according to the present aspect can be implemented as an apparatus that efficiently reads reference pixel data from a memory while efficiently decoding system coded data.

More specifically, system decoded data obtained by performing system decoding is temporarily stored into a decoded data memory. Then, the system decoded data is read in synchronization with image decoding on a macroblock basis and processed.

Here, the image decoding apparatus according to the present aspect specifies a reference area by obtaining, from the system decoded data, motion vector related information for each of the macroblocks simultaneously with storing into the decoded data memory.

Thus, processing such as specifying a reference area is carried out using the delay period that inevitably occurs accompanying system decoding. Therefore, the entire decoding processing does not have to be delayed for the processing.

As described above, the reference pixel data to be used for motion compensation in decoding is read from the decoded pixel memory prior to the motion compensation and stored in the reference pixel buffer according to the present invention.

In addition, the reference pixel data, when read from the decoded pixel memory, is read as being included in continuous pixel data that is part of reference picture.

Thus, even in the case where a decoded pixel memory is implemented using an external DRAM, for example, data is efficiently read from the DRAM and the capacity of the reference pixel buffer can be minimized.

Therefore, the present invention can provide an image decoding apparatus and an image decoding method with reduced circuitry costs and power consumption by reducing the amount of external memory access.

Further Information about Technical Background to This Application

The disclosure of Japanese Patent Application No. 2009-054265 filed on Mar. 6, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENT

Hereafter, embodiments of the present invention shall be described with reference to the drawings.

(Embodiment 1)

Figure 1:
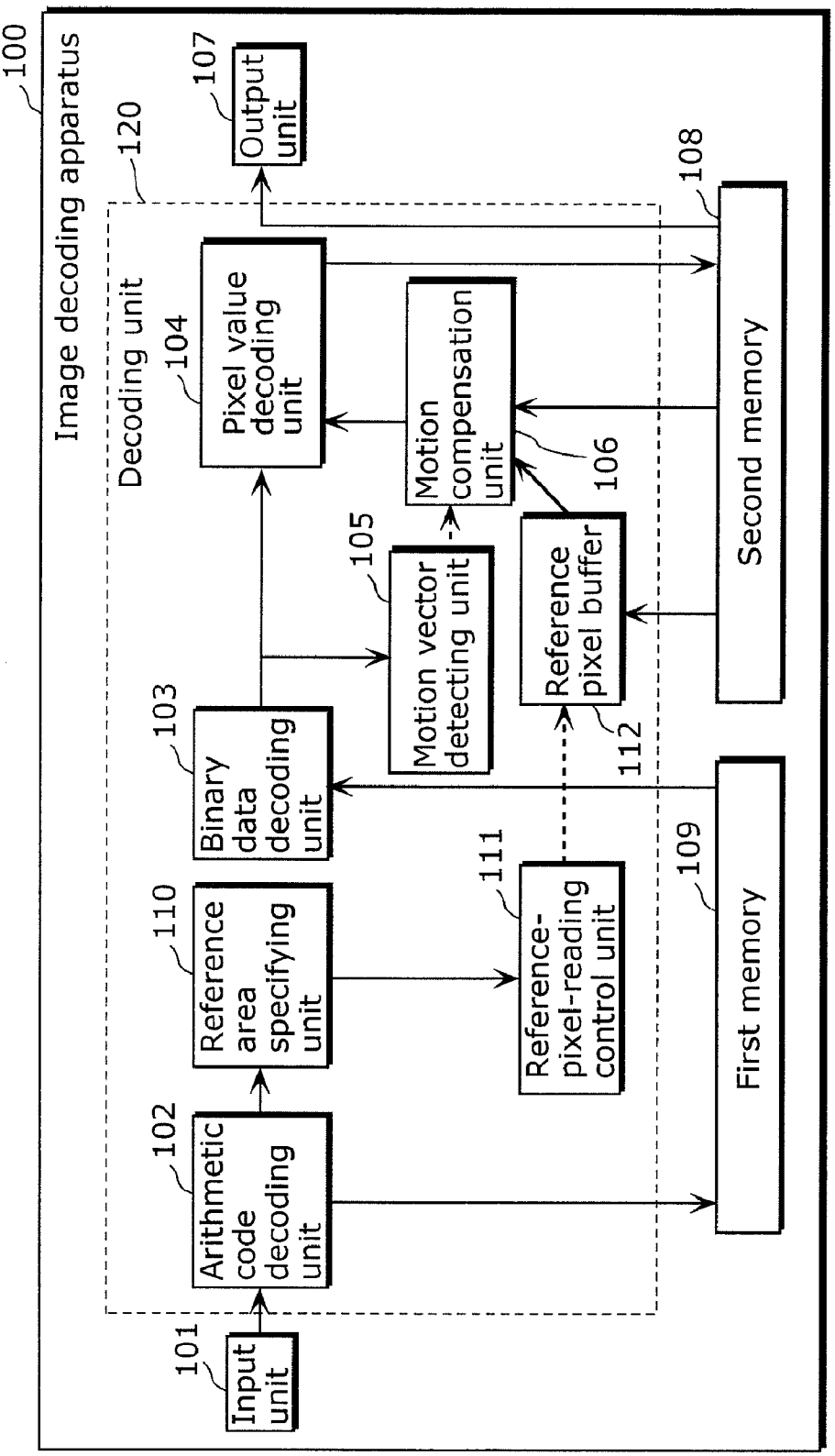
FIG. 1 is a block diagram which shows a main configuration of an image decoding apparatus according to Embodiment 1 of the present invention.

FIG. 1 is a block diagram which shows a main configuration of an image decoding apparatus 100 according to Embodiment 1 of the present invention.

As shown in FIG. 1, the image decoding apparatus 100 according to Embodiment 1 of the present invention includes: a decoding unit 120; an input unit 101; an output unit 107; a second memory 108; and a first memory 109.

Further, the decoding unit 120 includes: an arithmetic code decoding unit 102; a binary data decoding unit 103; a pixel value decoding unit 104; a motion vector detecting unit 105; a motion compensation unit 106; a reference area specifying unit 110; a reference-pixel-reading control unit 111; and a reference pixel buffer 112.

It is to be noted that, in the case where the decoding unit 120 is implemented as an integrated circuit, each of the first memory 109 and the second memory 108 is placed outside the integrated circuit and called, for example, as an external memory.

In addition, the first memory 109 is an example of a decoded data memory of the image decoding apparatus according to the present invention. The second memory 108 is an example of a decoded pixel memory of the image decoding apparatus according to the present invention. Further, the binary data decoding unit 103 is an example of the arithmetic decoded data decoding unit of the image decoding apparatus according to the present invention.

The following describes operations of the image decoding apparatus 100 configured as described above, with reference FIG. 2.

Figure 2:
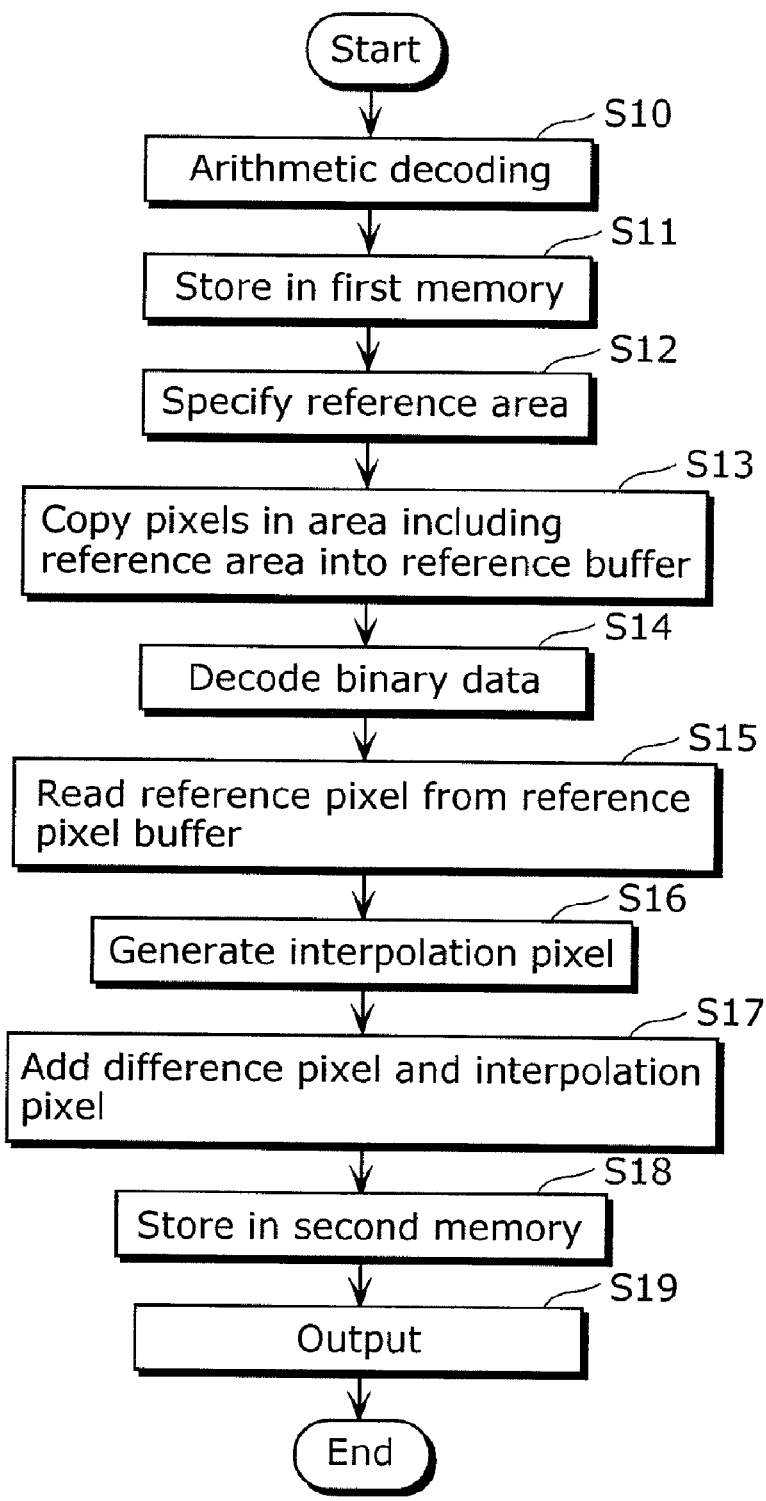
FIG. 2 is a flow chart which shows an operational flow of the image decoding apparatus according to Embodiment 1.

FIG. 2 is a flow chart which shows an operational flow of the image decoding apparatus 100 according to Embodiment 1.

An arithmetic coded image data included in a coded stream inputted into the input unit 101 first receives decoding on an arithmetic code in the arithmetic code decoding unit 102 to be converted into arithmetic decoded data (S10).

The arithmetic decoded data obtained through the decoding is stored in the first memory 109 (S11).

Here, in the case where the data obtained through the H.264 coding is decoded, the arithmetic decoded data described above is also called as binary data. Since the processing of decoding an arithmetic code generally involves a large variation in processing time, it is not possible to perform in synchronization with the processing of decoding a pixel value that is processed on a macroblock-by-macroblock basis.

That means it is not possible to perform the processing of the arithmetic code decoding unit 102 in synchronization with the processing including and subsequent to the binary data decoding unit 103.

For that reason, arithmetic decoded data for the plenty number of macroblocks is temporarily stored in a memory (the first memory 109 in the present embodiment). Further, the arithmetic decoded data is read from the memory to be processed, in synchronization with the subsequent decoding processing on a macroblock-by-macroblock basis.

Next, the arithmetic decoded data is inputted into the reference area specifying unit 110 in parallel with being stored into the first memory 109. In the reference area specifying unit 110, motion vector related information indicating motion vectors of plural macroblocks or information related to the motion vectors is detected.

It is to be noted that, in the embodiments 1 and 2, the motion vector related information is a term that refers not only to the motion vector itself but also information specifying the macroblock to which skip or a direct mode which do not require coding of the motion vector is applied. Further, in the case where the direct mode and the like are used, the following information is required: information related to the motion vector of a macroblock surrounding the macroblock on which arithmetic decoding is currently carried out; and information related to the motion vector of a picture to which is referred to by a macroblock of the picture on which arithmetic decoding is currently carried out. For that reason, in the case where the information is saved in a memory (the first memory 109, the second memory 108, or other memories), appropriate information is read from the memory to be used for specifying.

The reference area specifying unit 110 further specifies, by using the motion vector related information, a reference area which is an existing range of reference pixels in a reference picture based on a macroblock on which motion compensation is to be performed and which includes the reference pixels to be used for motion compensation on the picture (S12).

The reference-pixel-reading control unit 111, based on the reference area specified by the reference area specifying unit 110, copies pixel data (data in the reference pixel area) which is pixel data in an area including the reference area and continuous pixel data contained in the reference picture, into the reference pixel buffer 112 (S13).

More specifically, the reference-pixel-reading control unit 111 specifies, from among decoded pixel data stored in the second memory 108, a pixel that is likely to be necessary for motion compensation, and copies pixel data of part of the reference picture including the pixel into the reference pixel buffer 112.

Figure 3:
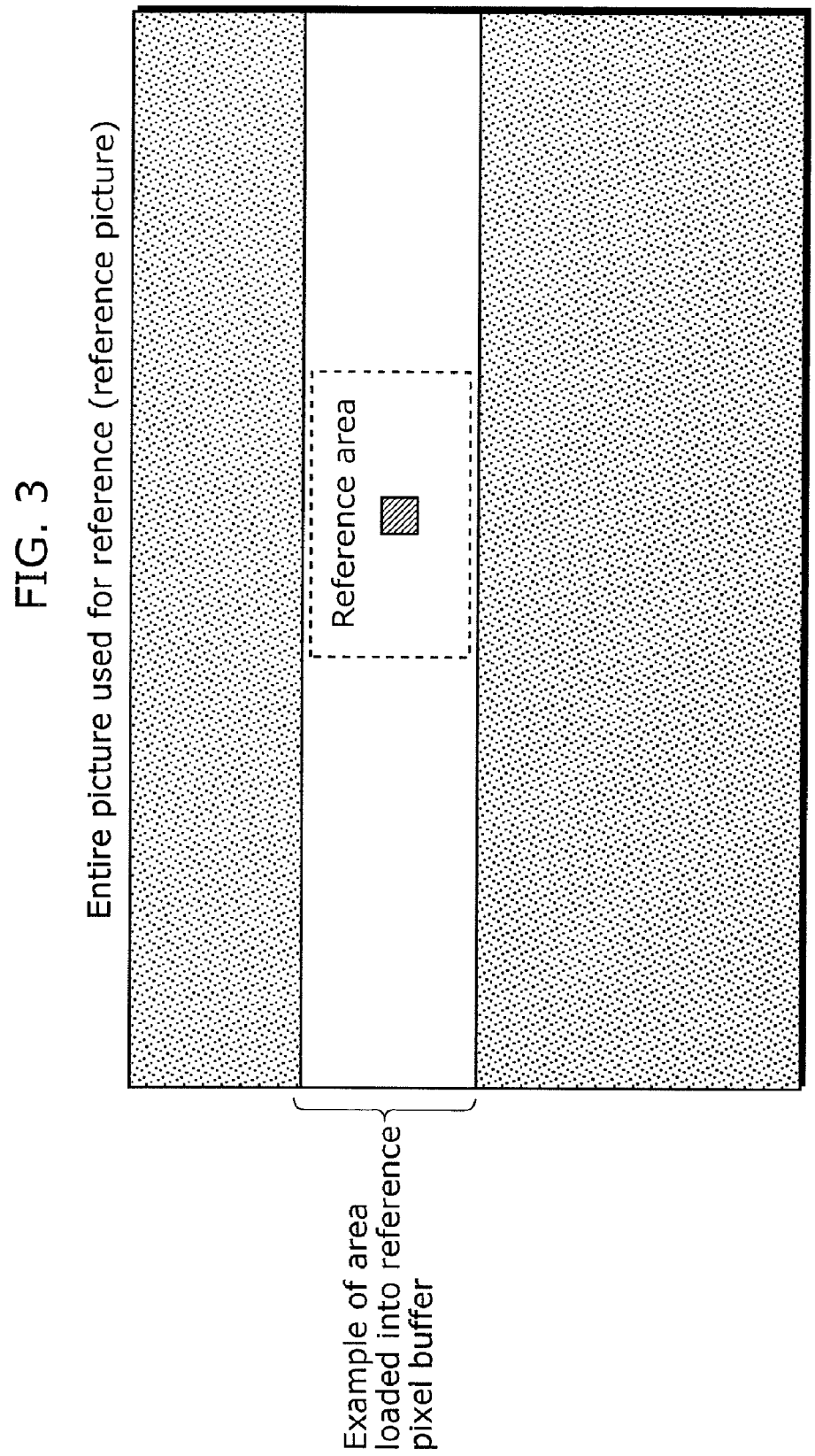
FIG. 3 is a schematic view which shows an example of a relation between a reference area specified by a reference area specifying unit and a reference pixel area that is loaded into a reference pixel buffer according to Embodiment 1.
Figure 4:
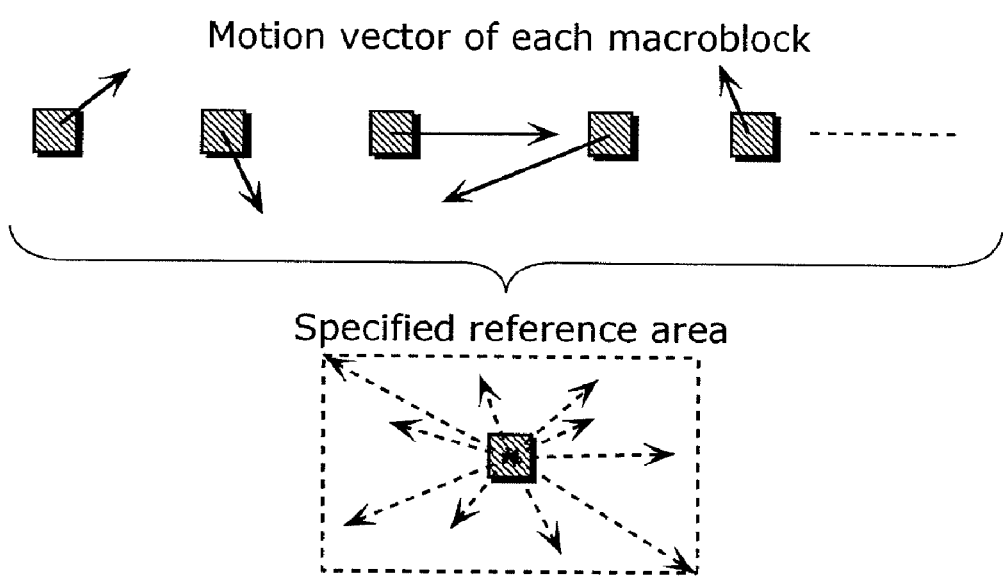
FIG. 4 is a schematic view which shows an example of the reference area specified by the reference area specifying unit according to Embodiment 1.

The following describes an example of a reference pixel area which is copied from the second memory 108 to the reference pixel buffer 112 by the reference-pixel-reading control unit 111, with reference to FIG. 3 and FIG. 4.

FIG. 3 is a schematic view which shows an example of a relation between a reference area specified by the reference area specifying unit 110 and a reference pixel area that is loaded into the reference pixel buffer 112.

The reference-pixel-reading control unit 111, as shown in FIG. 3, for example, copies continuous pixel data of part of the reference picture including the reference area specified by the reference area specifying unit 110, as a reference pixel area, from the second memory 108 to the reference pixel buffer 112.

Here, there is a possibility that the position of a reference pixel indicated by a motion vector used for motion compensation differs in direction for each macroblock as described above and that the magnitude of the motion vector also changes significantly.

Thus, the reference area specifying unit 110, to be specific, specifies a relative reference pixel position indicated by a motion vector, for each of the macroblocks in a base area. Further, the reference area specifying unit 110 specifies an area that encompasses the reference pixels at the specified positions, as a reference area based on the macroblock on which motion compensation is to be performed. It is to be noted that, the base area includes a part or the entire picture to be decoded in embodiments 1 and 2. One example of the base area is a slice obtained by dividing a picture in plural parts.

FIG. 4 is a schematic view which shows an example of the reference area specified by the reference area specifying unit 110.

As shown in FIG. 4, the picture to be decoded generally includes plural macroblocks each of which has a motion vector in a different direction and magnitude.

Thus, the reference area specifying unit 110 extracts each of the motion vectors of all of the macroblocks included in the base area in the picture to be decoded, for example. With this, the reference pixel position for each of the macroblocks is specified.

The reference area specifying unit 110 further specifies an area that encompasses the plural reference pixel positions, as a reference area based on the macroblock on which motion compensation is to be performed.

The following describes an example of a specific method for specifying the reference area using the reference area specifying unit 110. It is to be noted that, the following describes a specifying method in the case where the base area is an entire picture. However, the reference area is specified with the same processing in the case where the base area is a different unit such as a slice, as well.

First, an outline of the method of specifying the reference area is described. For example, in the case where a picture to be decoded refers to n pictures (n is an integer equal to or larger than 1), two vectors, that is, an upper left maximum vector and a lower right maximum vector are defined for each of the n reference pictures. It is possible here to call, as the reference area, an area enclosed in a rectangle which has diagonally opposite vertices including a coordinate indicated by the upper left maximum vector and a coordinate indicated by the lower right maximum vector with the origin (0, 0) being the origin point.

In specifying the reference area as described above, to be specific, default values (0, 0) are set to the upper left maximum vector and the lower right maximum vector for each of the n reference pictures at the beginning of processing. Then, every time the motion vector of each of the macroblocks included in the picture to be decoded is extracted, a coordinate indicated by the upper left maximum vector and a coordinate indicated by the lower right maximum vector with respect to the reference picture indicated by the motion vector are updated as necessary.

Performing the processing described above on all of the macroblocks included in the picture to be decoded makes it possible to specify n reference areas for n reference pictures.

More specifically, when it is assumed that plural macroblocks are placed at the same position, the area that encompasses reference pixel positions within a reference picture indicated by the motion vectors of the macroblocks is specified as the reference area of the reference picture.

The reference area specified as described above is notified to the reference-pixel-reading control unit 111. The reference-pixel-reading control unit 111 copies data of an area including the reference area from the second memory 108 to the reference pixel buffer 112.

In the examples as shown in FIG. 3 and FIG. 4, the small rectangle marked with diagonal lines indicates a position within the reference picture corresponding to the position of the macroblock to be coded. Further, a dashed rectangle surrounding the macroblock indicates the reference area, that is, the maximum range that includes reference pixels likely to be referred to by the macroblock in motion compensation.

Here, data of the reference pixel area including the reference area is copied from the second memory 108 to the reference pixel buffer 112 as described above.

In the embodiments 1 and 2, the reference-pixel-reading control unit 111 writes, into the reference pixel buffer 112, the area including the reference area and transversely covering the reference pictures as shown in FIG. 3.

As described above, the reference-pixel-reading control unit 111 reads continuous pixel data from the second memory 108. That means the reference-pixel-reading control unit 111 reads the data of the reference pixel area including the reference pixel data necessary for motion compensation, without reading the reference pixel data from a random position in the second memory 108. The data of the reference pixel area read from the second memory 108 is stored in the reference pixel buffer 112.

Further, with each progress of decoding processing on each macroblock, the reference-pixel-reading control unit 111 copies new reference pixel data into the reference pixel buffer 112.

To be specific, the reference-pixel-reading control unit 111 sequentially adds pixel data that has been read from the second memory 108 into the reference pixel buffer 112 so that at least pixel data included in the reference area for a macroblock is stored in the reference pixel buffer 112 before decoding on the macroblock immediately before the macroblock ends.

Further, at this time, pixel data of an adjoining macroblock is read sequentially from the second memory 108. Thus, overhead accompanying reading from a random position is reduced.

As described above, in the image decoding apparatus 100 according to Embodiment 1, pixel data that constantly includes reference area specified by the reference area specifying unit 110 is stored in advance in the reference pixel buffer 112.

The above structure eliminates the need to directly read reference pixel data necessary for motion compensation on a macroblock-by-macroblock basis from the second memory 108 implemented as an external DRAM, for example.

Next, the arithmetic decoded data (binary data) stored in the first memory 109 is read on a macroblock-by-macroblock basis by the binary data decoding unit 103 and decoding on the binary data is performed (S14).

With this decoding, data including a motion vector, residual pixel data, and the like, of a macroblock corresponding to the binary data is obtained.

The motion vector detecting unit 105 detects a motion vector of the macroblock from the data obtained by the binary data decoding unit 103. The motion compensation unit 106 reads reference pixel data used for motion compensation from the reference pixel buffer 112 based on the motion vector that has been detected (S15).

The motion compensation unit 106 performs motion compensation using the reference pixel data that has been read from the reference pixel buffer 112, thereby generating interpolation pixel data that is data of an interpolation pixel (S16).

The pixel value decoding unit 104 performs inverse quantization and inverse orthogonal transformation on the residual pixel data included in the data obtained from the binary data decoding unit 103 into a difference pixel value and adds the difference pixel value and the interpolation pixel data generated by the motion compensation unit 106, thereby decoding the pixel value (S17). The pixel value decoding unit 104 further writes decoded pixel data that is data obtained through a series of the above processes into the second memory 108 (S18).

The decoded pixel data stored in the second memory 108 is outputted from the output unit 107 in synchronization with a device connected to the image decoding apparatus 100 such as TV (S19).

It is to be noted that, the reference area specified through a series of the above processes (S12) is commonly used only for the macroblocks included in the base area to be decoded. Thus, when decoding the next base area, a series of processes including specifying a reference area (S12) for the next base area is performed. For example, in the case where the base area is a slice, a series of processes including specifying a reference area (S12) is performed on a slice-by-slice basis.

The image decoding apparatus 100 according to Embodiment 1, as described above, obtains a motion vector of plural macroblocks in advance in parallel with arithmetic decoding, and determines an area of a reference pixel necessary for motion compensation. Further, reference pixel area data that includes the determined area and is continuous pixel data is copied from the second memory 108 to the reference pixel buffer 112.

Thus, when motion compensation is performed on a macroblock-by-macroblock basis, it is only necessary to sequentially read pixel data to be added as reference pixel area data from the second memory 108 and to store into the reference pixel buffer 112.

Therefore, even when the second memory 108 is implemented as an external DRAM, it is possible to reduce overhead accompanying reading data from a random position and power consumption.

Here, in order to implement the above processing, it is necessary to store the arithmetic decoded data temporarily into the first memory 109 for obtaining a motion vector of plural macroblocks prior to decoding a pixel value on a macroblock-by-macroblock basis.

Thus, when compared to conventional image decoding apparatuses, the image decoding apparatus 100 according to Embodiment 1 appears to need the first memory 109 in addition to the conventional structure in order to absorb a delay that occurred due to detecting a motion vector in advance.

However, arithmetic decoding involves a significantly large variation in processing time, and thus cannot be performed in synchronization with pixel value decoding on a macroblock-by-macroblock basis.

Thus, conventional image decoding apparatuses that perform arithmetic decoding generally include a large buffer and carry out decoding on a macroblock-by-macroblock basis after delays for one to several pictures.

Therefore, in the case where the image decoding apparatus 100 according to Embodiment 1 is implemented using the structure of conventional image decoding apparatuses, the buffer included in the conventional image decoding apparatuses is used as the first memory 109. This makes it possible to implement the image decoding apparatus 100 without adding a new memory to the conventional image decoding apparatuses.

Further, specifying a reference area (S12 in FIG. 2) and copying data including a reference area into the reference pixel buffer 112 (S13 in FIG. 2) can be performed during a delay period accompanying arithmetic decoding.

Thus, processing such as specifying a reference area is efficiently carried out using the delay period that inevitably occurs accompanying arithmetic decoding. Therefore, the processing does not cause delay to the entire decoding processing.

It is to be noted that, the first memory 109 and the second memory 180 according to the present embodiment are two physically separate memories. However, the first memory 109 and the second memory 108 may be included in the same memory. In other words, the first memory 109 and the second memory 108 may be implemented physically as a single memory.

Further, according to the present embodiment, the reference area specifying unit 110 extracts a motion vector of each of the macroblocks included in the base area to be decoded and specifies a reference area using the motion vectors.

With this, in motion compensation for each of the macroblocks, necessary reference pixel data is stored in the reference pixel buffer 112 when the motion compensation for each of the macroblocks is performed.

However, the reference area specifying unit 110 may specify a reference area in view of only the motion vector of part of macroblocks included in a base area to be decoded.

For example, one or more motion vectors in an extremely large size may be ignored, out of motion vectors of all of the macroblocks included in the base area to be decoded, and the reference area may be specified using other motion vectors.

Another example is that a predetermined number of motion vectors out of all motion vectors may simply be ignored and the reference area may be specified using other motion vectors.

In such cases, when performing motion compensation on a macroblock corresponding to the motion vector that has been ignored, it is possible that reference pixel data does not exist in the reference pixel buffer 112. Thus, it is necessary to read reference pixel data directly from the second memory 108.

However, even when such a process is carried out, the number of data reading from a random position from the second memory 108 is reduced from conventional cases. Therefore, less overhead occurs than conventional cases.

Further, the size of a reference area can be reduced by ignoring a motion vector in an extremely large size. Therefore, the storage capacity of the reference pixel buffer 112 can be reduced from the storage capacity of the case where all of the motion vectors are considered.

(Embodiment 2)

Figure 5:
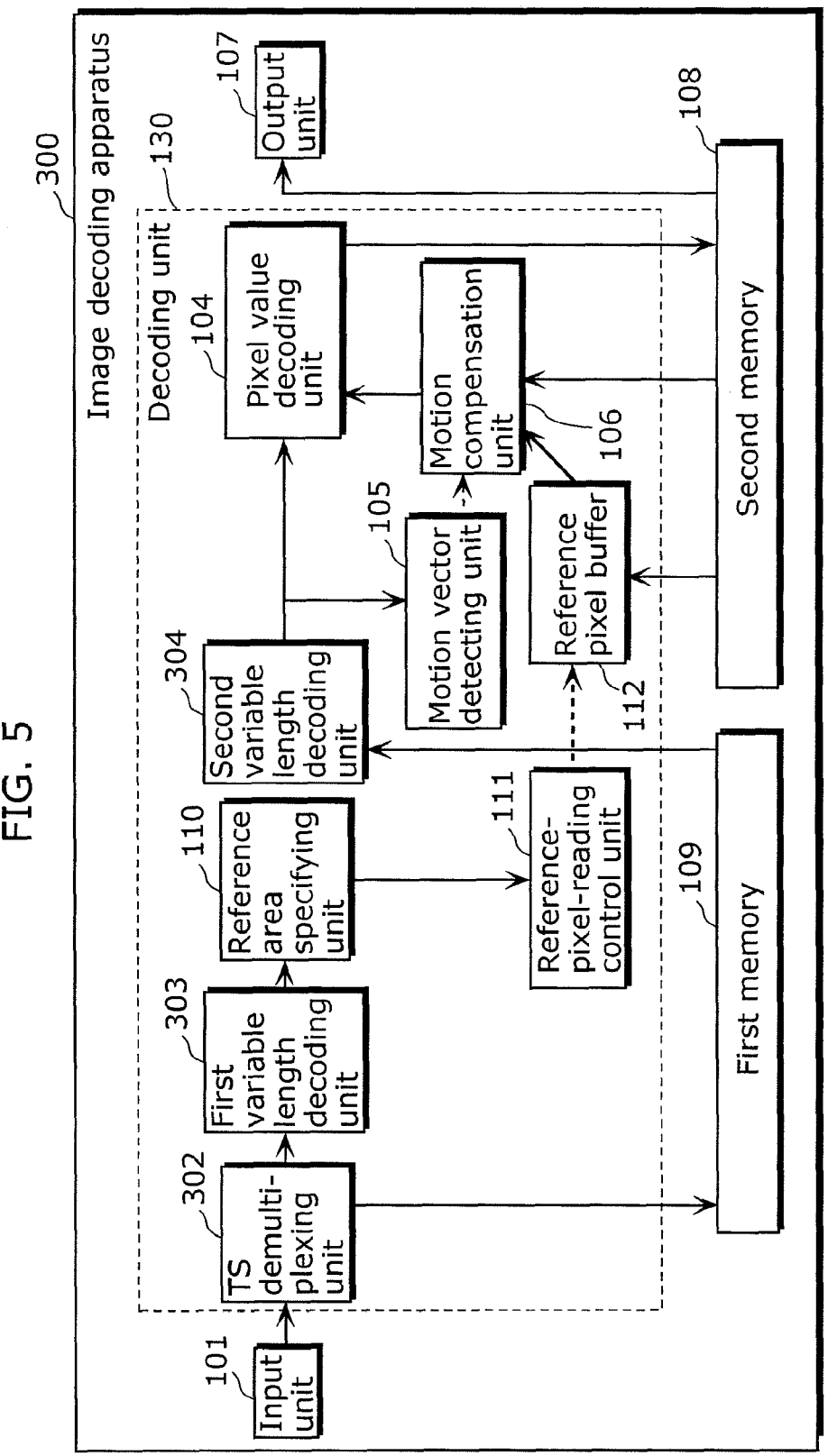
FIG. 5 is a block diagram which shows a main configuration of an image decoding apparatus according to Embodiment 2 of the present invention.

FIG. 5 is a block diagram which shows a main configuration of an image decoding apparatus 300 according to Embodiment 2 of the present invention.

An image decoding apparatus 300 is an apparatus that receives and decodes a transport stream (hereinafter referred to as a "TS") including data coded through transmission system coding (hereinafter referred to as "system coding") that complies with H.264.

As shown in FIG. 5, the image decoding apparatus 300 according to Embodiment 2 of the present invention includes: a decoding unit 130; an input unit 101; an output unit 107; a second memory 108; and a first memory 109.

Further, the decoding unit 130 includes: a TS demultiplexing unit 302; a first variable length decoding unit 303; a second variable length decoding unit 304; a pixel value decoding unit 104; a motion vector detecting unit 105; a motion compensation unit 106; a reference area specifying unit 110; a reference-pixel-reading control unit 111; and a reference pixel buffer 112.

It is to be noted that, the TS demultiplexing unit 302 is an example of a system decoding unit of the image decoding apparatus according to the present invention. The second variable length decoding unit 304 is an example of a variable length decoding unit of the image decoding apparatus according to the present invention.

As shown in FIG. 5, in the image decoding apparatus 300, the arithmetic code decoding unit 102 is replaced with the TS demultiplexing unit 302 and the first variable length decoding unit 303, and the binary data decoding unit 103 is replaced with the second variable length decoding unit 304, among structural elements (blocks) included in the image decoding apparatus 100 according to Embodiment 1 of the present invention as shown in FIG. 1.

Structural elements other than the structural elements described above perform processing similar to structural elements included in the image decoding apparatus 100.

For the above reason, the same numerals are assigned to the structural elements that perform processing in much the same way as the structural elements as shown in FIG. 1 and part of the description will be omitted here.

The following describes operations of the image decoding apparatus 300 configured as described above.

Image data which has been inputted into the 101 and system coded into a TS is first demultiplexed into image data and audio data by the TS demultiplexing unit 302.

Further, the TS demultiplexing unit 302 converts the image data obtained through the demultiplexing into system decoded data and stores the system decoded data into the first memory 109.

Here, since there is a large variation in processing time of system decoding processing performed on system coded data such as the TS, in general, the system decoding processing cannot be performed in synchronization with pixel value decoding processing performed on a macroblock-by-macroblock basis.

For that reason, system decoded data for the plenty number of macroblocks is temporarily stored in a memory (the first memory 109 in the present embodiment). Then, the system decoded data is read from the memory in synchronization with decoding processing on a macroblock-by-macroblock basis and is processed.

Next, the reference area specifying unit 110 obtains motion vector related information of plural macroblocks from the system decoded data generated by the TS demultiplexing unit 302.

To be specific, the system decoded data generated by the TS demultiplexing unit 302, in parallel with being stored into the first memory 109, undergoes variable length decoding processing performed by the first variable length decoding unit 303 and data that has been processed is inputted into the reference area specifying unit 110.

In the reference area specifying unit 110, motion vector related information indicating motion vectors of plural macroblocks or information related to the motion vectors is detected.

The reference area specifying unit 110 further specifies a reference area that is based on the macroblock on which motion compensation is to be performed, by using the motion vector related information.

It is to be noted that, the processing of specifying the reference area is the same as Embodiment 1. The reference area specifying unit 110, for example, specifies an area that encompasses reference pixels at positions indicated by plural motion vectors, as a reference area based on the macroblock on which motion compensation is to be performed, as shown in FIG. 4. In addition, in the case where there are plural reference pictures of the macroblock, a reference area is specified for each of the reference pictures.

Further, the reference-pixel-reading control unit 111 copies data of the reference pixel area including the reference area from the second memory 108 to the reference pixel buffer 112.

Next, the system decoded data stored in the first memory 109 is read by the second variable length decoding unit 304 on a macroblock-by-macroblock basis and decoding is performed on a variable length code.

The motion vector detecting unit 105 here detects a motion vector of the macroblock in the decoded data and read a reference pixel to be used for motion compensation from the reference pixel buffer 112.

The motion compensation unit 106 performs motion compensation using the reference pixel data that has been read from the reference pixel buffer 112, thereby generating interpolation pixel data.

The pixel value decoding unit 104 performs inverse quantization and inverse orthogonal transformation on the residual pixel data included in the data obtained from the binary data decoding unit 103 into a difference pixel value and adds the difference pixel value and the interpolation pixel data of motion compensation generated by the motion compensation unit 106, thereby decoding the pixel value and writing into the second memory 108.

The decoded pixel data stored in the second memory 108 is outputted from the output unit 107 in synchronization with a device connected to the image decoding apparatus 100 such as TV.

It is to be noted that, the reference area specified through the a series of the above processes is commonly used only for the macroblocks included in the base area to be decoded. Thus, when decoding the next base area, a series of processes including specifying a reference area for the next base area is performed.

Further, the audio data obtained from the TS demultiplexing unit 302 is decoded by an audio decoding unit that is not illustrated and outputted, for example, from the output unit 107 to the image decoding apparatus 100 such as TV.

Further, the first variable length decoding unit 303 only need to perform variable length decoding such that the reference area specifying unit 110 can detect information such as motion vector, and does not have to include the function same as the function of the second variable length decoding unit 304.

The image decoding apparatus 300 according to Embodiment 2, as described above, obtains a motion vector of plural macroblocks in advance in parallel with system decoding such as TS decoding, and determines an area of a reference pixel necessary for motion compensation. Further, reference pixel area data that includes the determined area and is continuous pixel data is copied from the second memory 108 to the reference pixel buffer 112.

Therefore, even when the second memory 108 is implemented as an external DRAM, it is possible to reduce overhead accompanying reading data from a random position and power consumption.

Here, in order to implement the above processing, it is necessary to store the system decoded data temporarily into the first memory 109 for obtaining a motion vector of plural macroblocks prior to decoding a pixel value on a macroblock-by-macroblock basis.

Thus, when compared to conventional image decoding apparatuses, the image decoding apparatus 300 according to Embodiment 2 appears to need the first memory 109 in addition to the conventional structure in order to absorb a delay that occurred due to detecting a motion vector in advance.

However, system decoding involves a significantly large variation in processing time, and thus cannot be performed in synchronization with pixel value decoding on a macroblock-by-macroblock basis.

Thus, conventional image decoding apparatuses that perform system decoding generally include a large buffer and carry out decoding on a macroblock-by-macroblock basis after delays for one to several pictures.

Therefore, in the case where the image decoding apparatus 300 according to Embodiment 2 is implemented using the structure of conventional image decoding apparatuses, the buffer included in the conventional image decoding apparatuses is used as the first memory 109. This makes it possible to implement the image decoding apparatus 300 without adding a new memory to the conventional image decoding apparatuses.

Further, specifying a reference area and copying data including a reference area into the reference pixel buffer 112 can be performed during a delay period accompanying system decoding.

Thus, processing such as specifying a reference area is carried out using the delay period that inevitably occurs accompanying system decoding As described above, the image decoding apparatus 300 according to Embodiment 2 performs processing such as specifying a reference area by using the period in which other processing is carried out, and thus the entire decoding processing does not have to be delayed for performing the processing, in the same manner as the image decoding apparatus according to Embodiment 1.

It is to be noted that, the first memory 109 and the second memory 109 are physically two separate memories also in Embodiment 2. However, the first memory 109 and the second memory 108 may be included in the same memory. In other words, the first memory 109 and the second memory 108 may be implemented physically as a single memory.

In addition, the reference area specifying unit 110 according to Embodiment 2 may specify a reference area in view of only the motion vector of part of macroblocks included in a base area to be decoded, in the same manner as the reference area specifying unit 110 according to Embodiment 1.

(Supplementary Note for Embodiment 1 and Embodiment 2) H.264 is used as an example in description in Embodiment 1 and Embodiment 2 according to the present invention. However, the present invention may be applied to any decoding processing corresponding to any image coding using motion compensation such as MPEG 2.

Further, the present invention, in addition to implementing as an image decoding apparatus including structural elements such as each unit according to Embodiment 1 and Embodiment 2 of the present invention, can also be implemented as: an image decoding method including the structural elements included in the image decoding apparatus, as its steps; and an image decoding program which causes a computer to executed the image decoding method.

Furthermore, such an image decoding program can be distributed via a recording medium such as a compact disc read only memory (CD-ROM) and a communication network such as the Internet.

Further, a part or all of the structure of each of the 100 according to Embodiment 1 and the image decoding apparatus 300 according to Embodiment 2 may be implemented as a single or plural integrated circuits.

Figure 6:
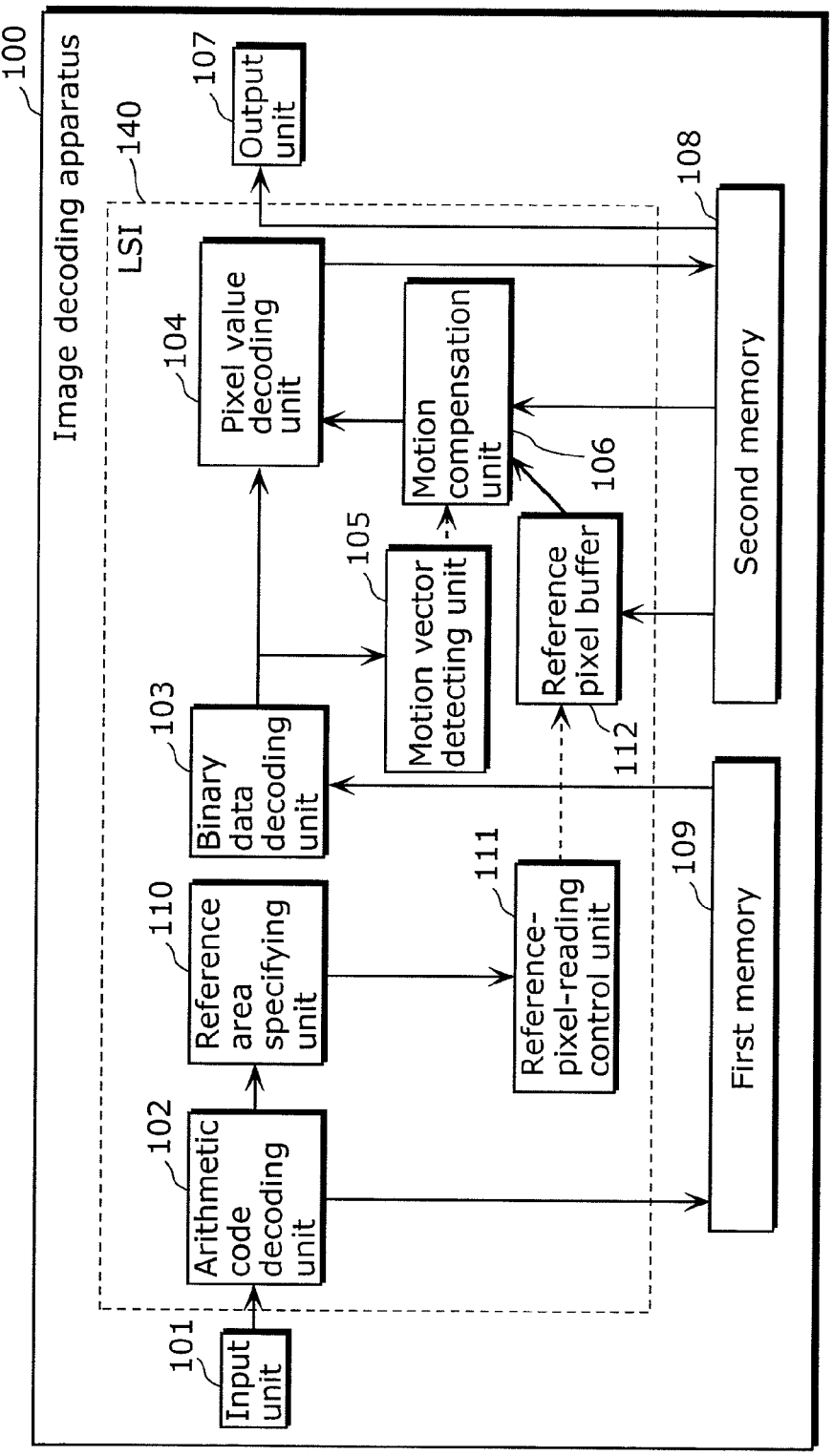
FIG. 6 is a diagram which shows an example of creation of an integrated circuit in the image decoding apparatus according to Embodiment 1.
Figure 7:
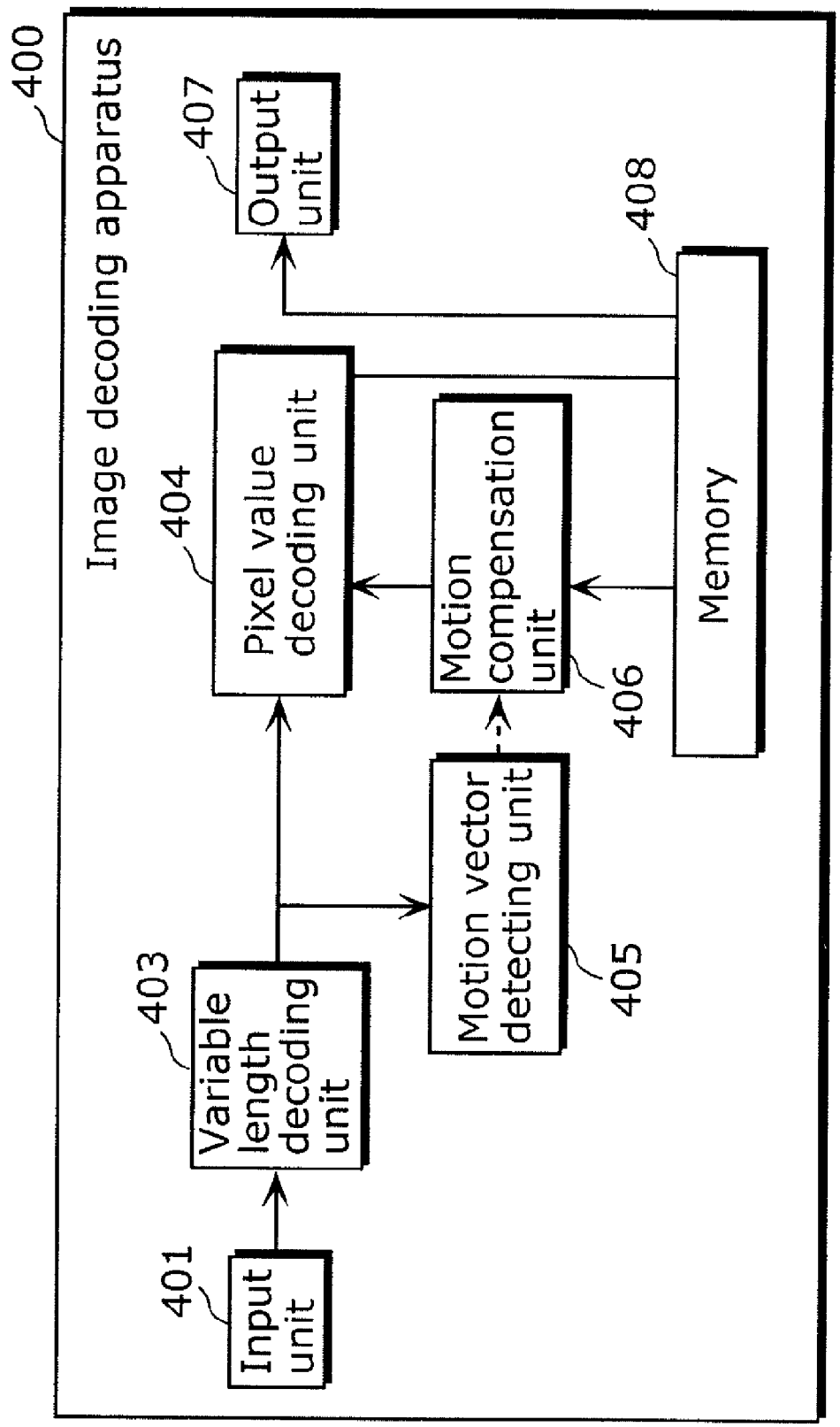
FIG. 7 is a block diagram which shows an example of the configuration of a conventional image decoding apparatus.

FIG. 6 is a diagram which shows an example of creation of an integrated circuit in the image decoding apparatus 100 according to Embodiment 1.

An LSI 140 as shown in FIG. 6 is an example of an integrated circuit including functional blocks included by the image decoding apparatus 100.

It is to be noted that, the functional blocks may be included separately into plural LSIs, instead of a single LSI.

Further, also in the image decoding apparatus 300 according to Embodiment 2, a part or all of the functional blocks included in the image decoding apparatus 300 may be implemented as an integrated circuit.

Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appears thorough progress in semiconductor technology or other derived technology, that technology can naturally be used to carry out integration of the functional blocks.

Further, each of the techniques described in Embodiments 1 and 2 may be combined.

The image decoding apparatus 300 according to Embodiment 2 may include the arithmetic code decoding unit 102 according to Embodiment 1. The above structure allows decoding processing to be properly performed even when the TS includes arithmetic coded data.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The image decoding apparatus and the image decoding method according to the present invention can reduce circuitry costs and power consumption by reducing the amount of external memory access from conventional cases. Thus, the present invention is useful as a decoding apparatus and a decoding method employed for a digital television, a digital camera, a digital video camera, a digital video recorder, and the like.

What is claimed is:

1. An image decoding apparatus which decodes a coded stream using motion compensation, said image decoding apparatus comprising:

an arithmetic decoding unit configured to perform arithmetic decoding on the coded stream, obtain at least motion related information which relates to a motion vector used in coding, and generate binary data resulting from the arithmetic decoding;

a memory which accumulates (i) the binary data in a first buffer and (ii) a reference picture in a second buffer, the reference picture being a decoded picture which is to be used in motion compensation;

a reference area specifying unit configured to specify a part of pixel data of the reference picture accumulated in said second buffer, based on the motion related information obtained by said arithmetic decoding unit;

a reference pixel buffer which is readable faster than said memory;

a reference-pixel-reading control unit configured to copy the part of pixel data specified by said reference area specifying unit, from said memory to said reference pixel buffer; and a decoding unit configured to perform decoding to generate, on a predetermined block-by-block basis, decoded pixel data using motion compensation, using (i) the pixel data which is specified based on the motion vector and is read from said reference pixel buffer and (ii) the binary data accumulated in said first buffer, wherein said reference area specifying unit is configured to specify at least the pixel data to be used in motion compensation on a current block to be decoded, prior to the decoding of the current block performed by said decoding unit, and said reference-pixel-reading control unit is configured to, prior to the motion compensation in the decoding, read, from said second buffer, the pixel data specified by said reference area specifying unit to copy the read pixel data to said reference pixel buffer.

2. The image decoding apparatus according to claim 1,
wherein said reference area specifying unit is configured to specify the part of the pixel data included in an area having a length identical to a length of the reference picture in a lateral direction, the area including at least the pixel data used when performing decoding, on the predetermined block-by-block basis, based on the motion related information.

3. The image decoding apparatus according to claim 1,
wherein said first buffer and said second buffer are two physically separate buffers.

4. The image decoding apparatus according to claim 1,
wherein said first buffer and said second buffer are implemented physically as a single buffer.

* * * * *